US008480402B2

(12) United States Patent
Pecherski

(10) Patent No.: US 8,480,402 B2
(45) Date of Patent: Jul. 9, 2013

(54) EDUCATIONAL GAME

(76) Inventor: Semion Pecherski, Beer-Sheva (IL)

( * ) Notice: Subject to any disclaimer, the term of this patent is extended or adjusted under 35 U.S.C. 154(b) by 231 days.

(21) Appl. No.: 12/990,795

(22) PCT Filed: Feb. 25, 2009

(86) PCT No.: PCT/IL2009/000176
§ 371 (c)(1),
(2), (4) Date: Nov. 3, 2010

(87) PCT Pub. No.: WO2009/138974
PCT Pub. Date: Nov. 19, 2009

(65) Prior Publication Data
US 2011/0089640 A1    Apr. 21, 2011

(30) Foreign Application Priority Data
May 13, 2008 (IL) .......................................... 191408

(51) Int. Cl.
*G09B 19/00* (2006.01)
(52) U.S. Cl.
USPC .......................................................... 434/258
(58) Field of Classification Search
USPC .............................. 434/247, 258, 259; 446/75
See application file for complete search history.

(56) References Cited

U.S. PATENT DOCUMENTS

| 611,504 | A | * | 9/1898 | Perky | 273/400 |
|---|---|---|---|---|---|
| 1,211,379 | A | | 1/1917 | Maisch | |
| 2,130,820 | A | | 9/1938 | Trumbull | |
| 2,911,740 | A | * | 11/1959 | Miller | 434/259 |
| D214,928 | S | * | 8/1969 | Swett et al. | D21/470 |
| 3,760,511 | A | * | 9/1973 | Matsumoto | 434/259 |
| 4,149,717 | A | * | 4/1979 | Seijiro | 273/440 |
| 4,349,197 | A | | 9/1982 | Livick | |
| 4,455,781 | A | | 6/1984 | Blumenthal | |
| 4,508,512 | A | * | 4/1985 | Girsch et al. | 434/259 |
| 4,609,356 | A | * | 9/1986 | Gilden et al. | 434/259 |
| D307,616 | S | * | 5/1990 | Kelly | D21/702 |
| 4,938,485 | A | | 7/1990 | Hockridge | |
| D319,082 | S | * | 8/1991 | Harris | D21/470 |
| 5,139,453 | A | * | 8/1992 | Aiken et al. | 446/75 |
| 5,314,338 | A | * | 5/1994 | Caveza et al. | 434/259 |
| 5,378,184 | A | * | 1/1995 | Bro et al. | 446/99 |
| 5,692,979 | A | * | 12/1997 | Jones | 473/470 |
| 6,142,890 | A | * | 11/2000 | Craig | 473/472 |
| 6,231,345 | B1 | * | 5/2001 | Yamazaki et al. | 434/259 |
| 7,011,310 | B2 | * | 3/2006 | Rowan | 273/398 |
| 7,766,771 | B2 | * | 8/2010 | Vysosias | 473/472 |

FOREIGN PATENT DOCUMENTS

GB        2253935 A     9/1992
WO   WO 2006/062530 A1  6/2006

* cited by examiner

*Primary Examiner* — Kurt Fernstrom
(74) *Attorney, Agent, or Firm* — Daniel J. Swirsky; AlphaPatent Associates Ltd.

(57) ABSTRACT

In one aspect, the present invention is directed to an educational game comprising: a structure rotating around a vertical axis; a plurality of frames, each connected to the structure, each of the frames having a geometrical form, each of the frames having a basket suspended therefrom; and a plurality of bricks, each having a form corresponding to the geometrical form of one of the frames. According to one embodiment of the invention, each of the bricks has a prism form. According to one embodiment of the invention, the bricks are of polyhedron form. The structure may comprise a central pole on which the baskets hang, each via a rod. A base may be employed for holding the central pole upright.

15 Claims, 5 Drawing Sheets

EDUCATIONAL GAME

CROSS-REFERENCE TO RELATED APPLICATIONS

The current application is a U.S. National Phase Application under 35 U.S.C. 371 of PCT International Application No. PCT/IL2009/000176, which has an international filing date of Feb. 25, 2009, and which claims the benefit of priority from Israel Patent Application No. 191,408, filed May 13, 2008, whose disclosure is incorporated herein by reference.

FIELD OF THE INVENTION

The present invention relates to the field of educational games. More particularly, the present invention relates to an educational game.

BACKGROUND OF THE INVENTION

An educational game is a game designed to teach people, typically children, about a specific subject, or help them acquire a new skill as they play.

It is an object of the present invention to provide an educational game which introduces a child to several geometrical forms.

It is another object of the present invention to provide an educational game by which a child improves his ability to identify geometrical patterns.

It is a further object of the present invention to provide an educational game by which a child can improve his motor abilities.

It is a still further object of the present invention to provide an educational game which provides a challenge to a child.

Other objects and advantages of the invention will become apparent as the description proceeds.

SUMMARY OF THE INVENTION

The following embodiments and aspects thereof are described and illustrated in conjunction with systems, tools methods, and so forth, which are meant to be merely illustrative, not limiting in scope.

In one aspect, the present invention is directed to an educational game comprising:
- a structure (14) rotating around a vertical axis;
- a plurality of frames (12), each connected to the structure, each of the frames having a geometrical form, each frame having a basket (24) suspended therefrom; and
- a plurality of bricks (26), each having a form corresponding to the geometrical form of one of the frames;
- wherein the geometrical forms of the frames and of the bricks correspond to the pattern recognition skills of the infant player;
- thereby improving the pattern recognition skills of the infant player along with improving motorical skills thereof.

According to one embodiment of the invention, each of the bricks has a prism form (as illustrated in FIG. 5).

According to one embodiment of the invention, the bricks are of polyhedron form. According to one embodiment of the invention, one of the bricks has a spherical form. According to one embodiment of the invention, each basket has the capacity to hold one brick. According to another embodiment of the invention, each basket has the capacity of N bricks (e.g., 2).

As per the structure, it may comprise a central pole on which the baskets hang, each via a rod. A base may be employed for holding the central pole upright.

Preferably, the parts of the game are designed to be assembled and disassembled, thereby rendering compact storage of the game.

Each basket may further comprise a clip, thereby allowing rapid removal of the bricks from the basket.

The capacity of each basket can be rendered adjustable by a clip. Of course the clip must be designed accordingly.

According to one embodiment of the invention, the pieces of each single geometrical form are of the same color, each form being associated with a different color. For example, the frame of the circle form, the basket thereof and the ball brick is red, and the frame, basket and box brick of the rectangle form is green.

According to another embodiment of the invention, the same color applies to all pieces.

According to yet another embodiment of the invention, each of the pieces is of a random color.

According to one embodiment of the invention, the frame dimensions and those of the corresponding bricks allow passing a brick only through its corresponding frame (as illustrated in FIGS. 4a and 4b).

In addition to the exemplary aspects and embodiments described above, further aspects and embodiments will become apparent by reference to the figures and by study of the following detailed description.

BRIEF DESCRIPTION OF THE DRAWINGS

The objects and features of the present invention will become apparent from the following detailed description considered in conjunction with the accompanying drawings, in which.

Figure 4A:
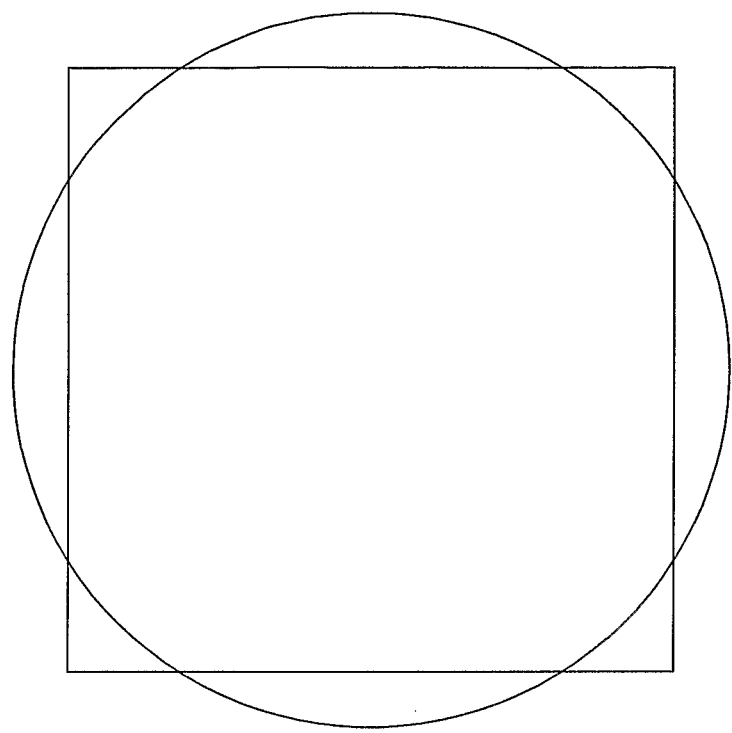
Figure 4B:
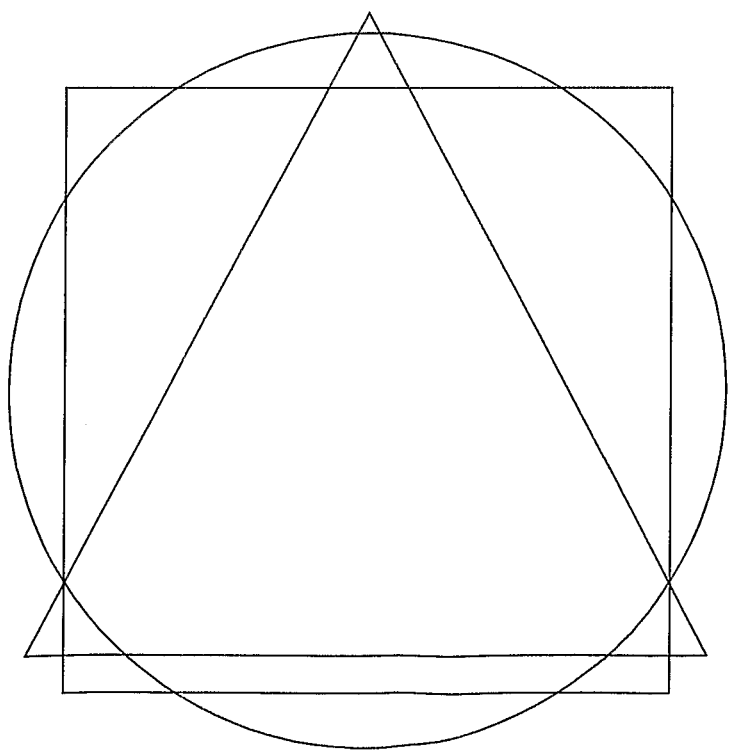

Each of FIGS. 4a and 4b illustrate two-dimensional geometrical forms, and the relation between their dimensions.

Figure 5:
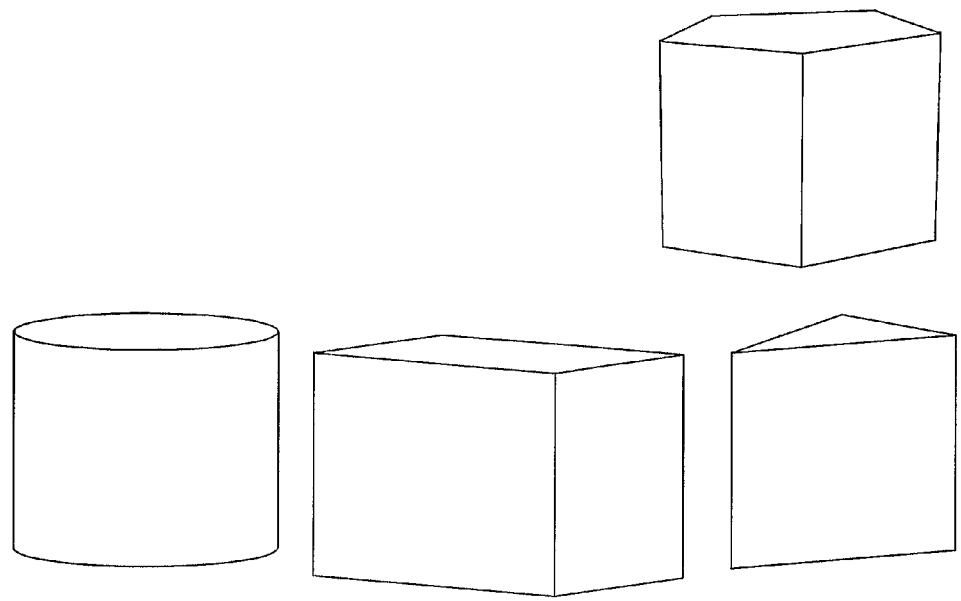

FIG. 5 schematically illustrates examples of prism bricks, according to one embodiment of the invention.

Figure 6:
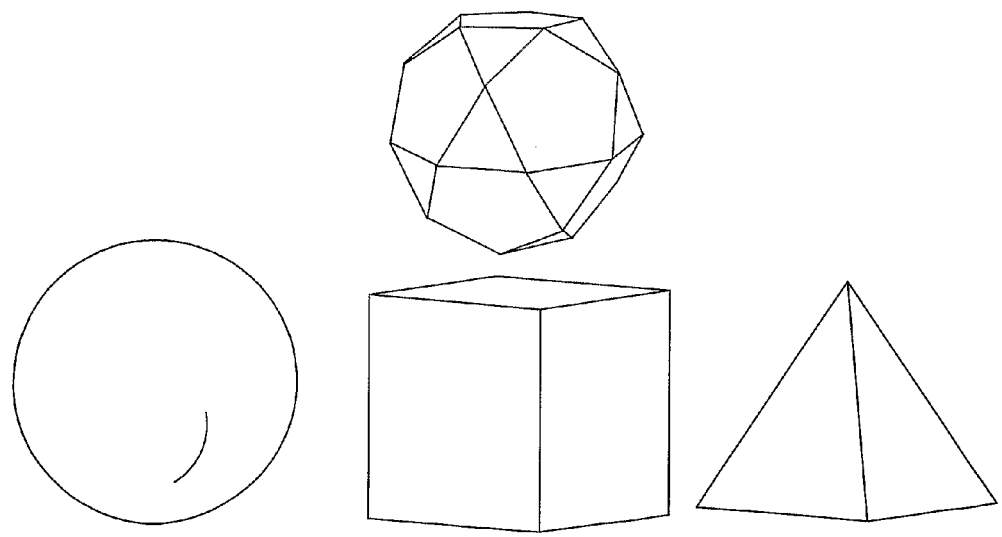

FIG. 6 schematically illustrates examples of polyhedron bricks, according to one embodiment of the invention.

It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, are merely intended to conceptually illustrate the structures and procedures described herein. Reference numerals may be repeated among the figures in order to indicate corresponding or analogous elements.

DETAILED DESCRIPTION OF PREFERRED EMBODIMENTS

In the following detailed description, numerous specific details are set forth in order to provide a thorough understanding of the invention. However, it will be understood by those skilled in the art that the present invention may be practiced without these specific details. In some instances, well-known methods, procedures, components and circuits have not been described in detail, for the sake of brevity.

Figure 1:
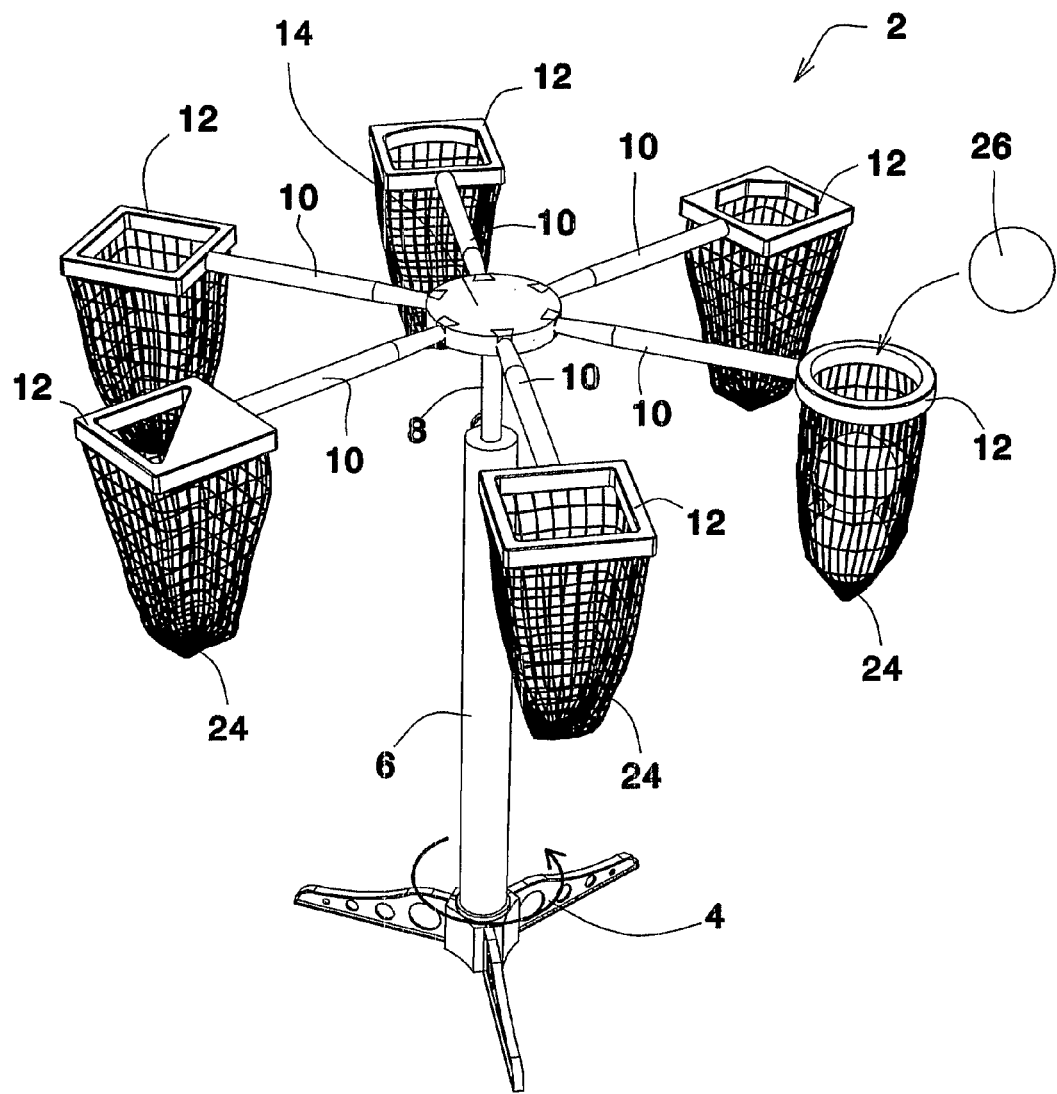
FIG. 1 is a perspective view schematically illustrating an educational game, according to one embodiment of the invention.

FIG. 1 is a perspective view schematically illustrating an educational game, according to one embodiment of the invention.

According to this embodiment of the invention, the game comprises a vertical pole (parts 6 and 8) on which rods 10 (referred to herein as arms) are connected in a "star form". The pole is referred to herein as the central pole. Each arm 10 ends with a frame 12 having a geometrical form such as a circle, rectangle, square, triangle, polygon, and so forth.

The game also comprises a plurality of three-dimensional game pieces 26 (referred to herein as bricks), each having a contour corresponding to the geometrical form of a frame. Each brick is designed such that it can be passed through one of frames 12 into a basket 24 thereof.

Each of arms 10 is rotatable around the central pole, i.e., the central pole actually being an axle.

Thus, the game comprises a rotatable mechanism along an axis, to which is attached a plurality of frames, each having a geometrical form, wherein on each of the frames a basket is suspended; and a plurality of bricks, each having a contour corresponding to the geometrical form of a frame.

The rotatable mechanism allows a child to rotate the rotatable mechanism until the frame with a desired form approaches him.

A base 4 maintains a stable structure.

Figure 2:
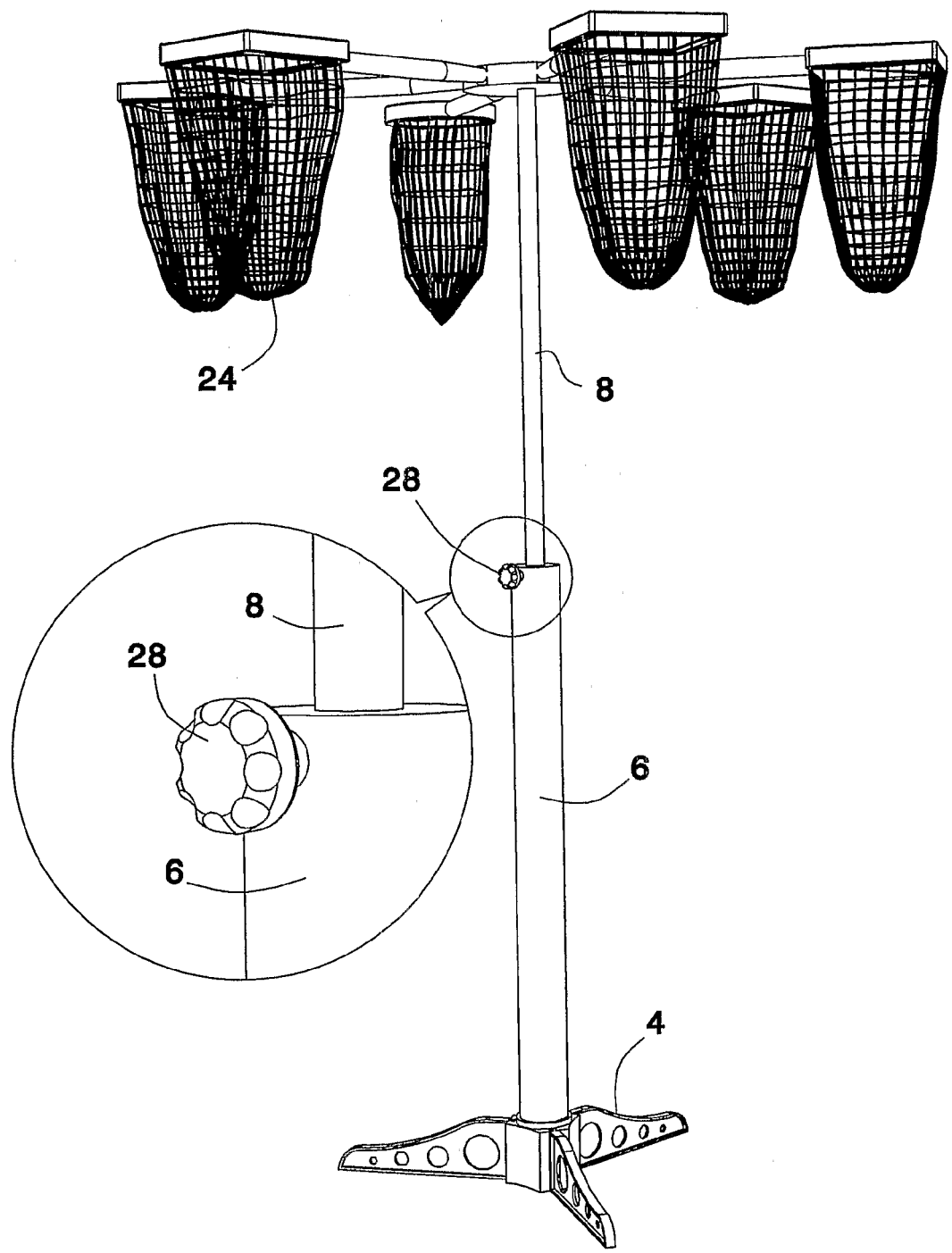
FIG. 2 is a perspective view of the educational game of FIG. 1, from a different angle.

FIG. 2 is a perspective view of the educational game of FIG. 1, from a different angle.

In this embodiment, the central pole is "telescopic", comprising two segments: an inner cylinder 8, interlaced in an outer cylinder 6. Of course a telescopic pole of two segments is merely an example, and more segments may be used. A knob 28 is used to secure one segment to the other. Knob 28 is actually a bolt.

The zoomed view is of knob 28, which is used for securing the two interlacing parts of the central pole. As the central pole is telescopic, its length is adjustable, and its parts can be secured to each other.

Figure 3:
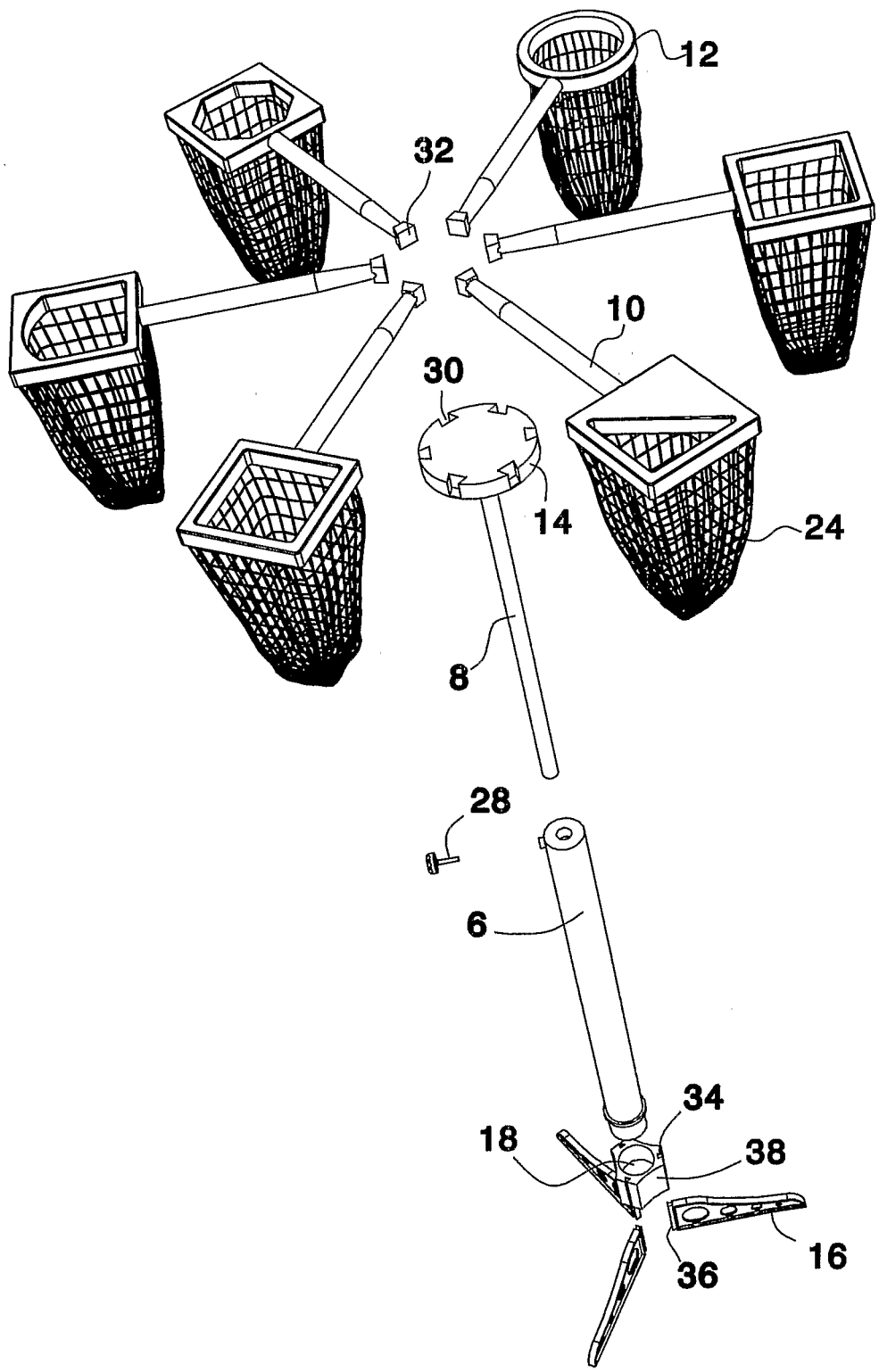
FIG. 3 is an exploded view of an educational game, according to one embodiment of the invention.

FIG. 3 is an exploded view of an educational game, according to one embodiment of the invention.

As illustrated, according to this embodiment of the invention rods 10 are detachable from the central pole (segments 6 and 8). In order to allow attaching and detaching rods 10 from the central pole, disk 14 which is connected to the central pole, comprises a trapezoid female socket 30, while each of rods 10 ends in a corresponding male member 32.

The legs 36 of base 4 are also detachable by a similar mechanism. Member 38 comprises a female socket 34 which corresponds to the male member 36 of a leg 16 of base 4.

Member 38 also comprises a bore 18, which corresponds to the form of cylinder 6. The size and form of cylinder 6 and bore 18 allow cylinder 6 to rotate while inserted in bore 18. This is the mechanism that enables frames 12 to rotate along the axis of the central pole (the axis is not illustrated).

The fact that the parts of the game can be disassembled results in compact storage, which is useful at home as well as when shipped. Actually, the entire game can be stored in a box.

The capacity of the basket can be adjusted by a clip (not illustrated).

According to one embodiment of the invention, the clip has a temporary nature, thereby allowing easy removal of the bricks from a basket.

According to another embodiment of the invention, the end of a basket is closed in a "permanent manner". In this case, the only way to remove bricks from a basket is through the frame thereof.

The Object of the Game

The object of a player (a child) is to put each brick into the basket of the corresponding frame (referred to herein as "to play the bricks").

The capacity of a basket can be designed to enable inserting a fixed number of bricks, for example one brick, three bricks, and so on.

The present invention provides an educational game which introduces a child to several geometrical forms. In addition, by practicing the game, the player (a child) improves his ability to identify geometrical patterns, improves his motor abilities, and his willingness to deal with challenges.

The Relation Between the Dimensions of the Geometric Forms

Preferably, the form of frames 12 and corresponding bricks 26 can be designed such that a brick can be inserted only into the corresponding basket. For example, in order to prevent a ball brick from being inserted into the basket of the square frame, the ball's diameter must be greater than the ribs of the square frame.

This point will be better understood with the illustrations of FIGS. 4a and 4b.

FIG. 4a illustrates two two-dimensional geometrical forms, a circle and a square, and the relation between their dimensions.

Assuming the circle is a brick, and the square is a frame, the relation between their dimensions does not allow the circle brick to pass through the square frame.

And vice versa: assuming the square is a brick, and the circle is a frame, the relation between their sizes does not allow the square brick to pass through the circle frame.

FIG. 4b illustrates this solution with three geometric forms: a circle, a square and a triangle. Each of the geometrical forms may be a frame or a brick. As illustrated, the brick cannot be passed through the frame of a different geometric form due to the dimensions thereof.

Although the subject has been explained in a two-dimensional example, those skilled in the art will appreciate that the same principles can also be applied for a three-dimensional brick.

The Bricks

Preferably the bricks are made of stiff material, in order to prevent deformation when attempting to insert a brick into a non-corresponding frame.

According to one embodiment of the invention, the three-dimensional form of a brick is a prism, such as those illustrated in FIG. 5.

According to a preferred embodiment of the invention, the three-dimensional brick form is a polyhedron which corresponds to the two-dimensional form of its frame, as those illustrated in FIG. 6. In this regard, a ball is actually a polyhedron with an endless number of facets.

Playing Levels

From experiments carried out by the inventors of the present invention, the game is particularly suited to ages 4 to 6. Nevertheless, it can be played by children younger or older.

According to one embodiment of the invention, the pieces of a geometrical form are of the same color, each form being associated with a different color. For example, the frame of a circle form, its basket and ball brick is red, and frame, basket and box brick of the rectangle form is green.

According to another embodiment of the invention, the same color applies to all pieces. This provides a higher level of challenge, since there is no association between a color and the geometric form of the basket.

According to yet another embodiment of the invention, each of the pieces is of a random color. In this embodiment as well, there is no association between a color and a geometric form of the basket, and the colors provide the game with a more appealing look.

In the figures and description herein, the following numerals have been mentioned:

numeral 2 denotes an educational game, according to embodiments of the present invention;
numeral 4 denotes a base;
each of numerals 6 and 8 denote a segment of a telescopic pole;
numeral 10 denotes a rod;
numeral 12 denotes a frame of a geometrical form;
numeral 14 denotes a structure rotating around a vertical axis;
numeral 16 denotes a leg of base 4;
numeral 18 denotes a bore corresponding to segment 6;
numeral 24 denotes a basket;
numeral 28 denotes a knob;
numeral 30 denotes a female member of a connector;
numeral 32 denotes a male member of a connector;
numeral 34 denotes a female member of a connector;
numeral 36 denotes a male member of a connector; and
numeral 38 denotes a piece of the base 4, to which the legs of the base are connected.

While certain features of the invention have been illustrated and described herein, the invention can be embodied in other forms, ways, modifications, substitutions, changes, equivalents, and so forth. The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. An educational game comprising:
    a structure rotating around a vertical axis;
    a plurality of frames, each connected to said structure, said frames having different geometrical forms, each of said frames having a basket suspended therefrom; and
    a plurality of bricks, each having a form corresponding to the geometrical form of one of said frames,
    wherein the size of said game of rotating said structure until the frame with a desired geometrical form approaches, corresponds to the motorical skills of an infant player, and
    wherein said geometrical forms of said frames and of said bricks correspond to the pattern recognition skills of said infant player,
thereby improving the pattern recognition skills of said infant player along with improving motorical skills thereof.

2. An educational game according to claim 1, wherein at least one of said bricks has a prismatic form.

3. An educational game according to claim 1, wherein at least one of said bricks has a polyhedron form.

4. An educational game according to claim 1, wherein one of said bricks has a spherical form.

5. An educational game according to claim 1, wherein each of the baskets is of a one-brick capacity.

6. An educational game according to claim 1, wherein each of the baskets is of several bricks capacity.

7. An educational game according to claim 1, wherein said structure comprises a central pole on which said baskets hang, each via a rod.

8. An educational game according to claim 7, wherein said central pole is telescopic.

9. An educational game according to claim 1, further comprising a base for holding said central pole upright.

10. An educational game according to claim 1, wherein the parts thereof are designed to be assembled and disassembled, thereby enabling compact storage.

11. An educational game according to claim 1, wherein pieces of a geometrical form have the same color, each of said forms associated with a different color.

12. An educational game according to claim 1, wherein the same color applies to all pieces.

13. An educational game according to claim 1, wherein the pieces have random colors.

14. An educational game according to claim 1, wherein the elevation of said baskets is adjustable.

15. An educational game according to claim 1, wherein the dimensions of the frames and their corresponding bricks allows passing a brick only through its corresponding frame.

\* \* \* \* \*